United States Patent
Shibazaki et al.

(10) Patent No.: US 6,344,719 B2
(45) Date of Patent: Feb. 5, 2002

(54) MOTOR DRIVING APPARATUS FOR CONTROLLING PLURALITY OF MOTORS WITH LESS MOTOR DRIVING UNITS THAN MOTORS

(75) Inventors: Ken Shibazaki; Masaaki Tanaka, both of Miyagi-ken (JP); Toshiyuki Hoshi, Lake Orion, MI (US); Satoshi Terashita; Ken Mizuta, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/782,244

(22) Filed: Feb. 13, 2001

(30) Foreign Application Priority Data

Feb. 17, 2000 (JP) .......................................... 12-039868

(51) Int. Cl.[7] .............................................. H02P 1/58
(52) U.S. Cl. ............................ 318/34; 318/112; 318/54
(58) Field of Search ............................. 318/112, 34, 54

(56) References Cited

U.S. PATENT DOCUMENTS

| | | | |
|---|---|---|---|
| 4,644,232 A | * 2/1987 | Jojiri et al. | 318/66 |
| 4,670,693 A | * 6/1987 | Kazami et al. | 318/112 |
| 4,712,049 A | * 12/1987 | Houserman | 318/112 |
| 4,774,441 A | * 9/1988 | Toyomasu et al. | 318/102 |
| 4,825,133 A | * 4/1989 | Tanuma et al. | 318/113 |
| 5,534,758 A | * 7/1996 | Yamamoto et al. | 318/112 |
| 5,889,376 A | 3/1999 | Takatsuka et al. | 318/434 |
| 5,903,121 A | 5/1999 | Heine et al. | 318/434 |

* cited by examiner

Primary Examiner—Robert E. Nappi
Assistant Examiner—Rita Leykin
(74) Attorney, Agent, or Firm—Brinks Hofer Gilson & Lione (57) ABSTRACT

The motor driving apparatus comprises a plurality of motors for displacing the position of the control object member, semiconductor switch pairs, a plurality of motor driving units for connecting the motors to the power supply and a control unit for ON/OFF controlling the semiconductor switch pairs. The motors form two sets of motors with each set being formed of two motors. One end of the motors and forming each set is connected to the common motor driving unit having the semiconductor switch pair and the other end of the motors and forming each set is connected to the motor driving units having the semiconductor switch pairs in each set. When the motors of each set are driven simultaneously, the control unit turns ON and OFF two semiconductor switch pairs and drives the motors of each set on the time division basis to provide inverse output polarities of the two semiconductor switch pairs connected to the motors of each set. Thereby there is provided a low price motor driving apparatus that has reduced the total number of motor driving units using the motor driving units having the semiconductor switch pairs.

4 Claims, 5 Drawing Sheets

MOTOR DRIVING APPARATUS FOR CONTROLLING PLURALITY OF MOTORS WITH LESS MOTOR DRIVING UNITS THAN MOTORS

BACKGROUND OF THE INVENTION

1. Field of the Invention

The present invention relates to a motor driving apparatus and particularly to a motor driving apparatus for controlling a plurality of motors to displace the position of the control object member with less motor driving units including a pair of semiconductor switches than the motors.

2. Description of the Related Art

In general, a vehicle uses a plurality of motors to displace the position of the control objects member such as power seats and power mirrors or the like and the motor driving units of the same number as the motors are used to individually drive these motors. Moreover, a motor driving apparatus is composed of a plurality of motors, a plurality of motor driving units and a control unit. In this case, it is preferable that the motor driving apparatus is as low in price as possible because the motor driving units in the same number as the motors used must be provided. Therefore, a motor driving unit comprising a pair of relays has been used.

Figure 5:
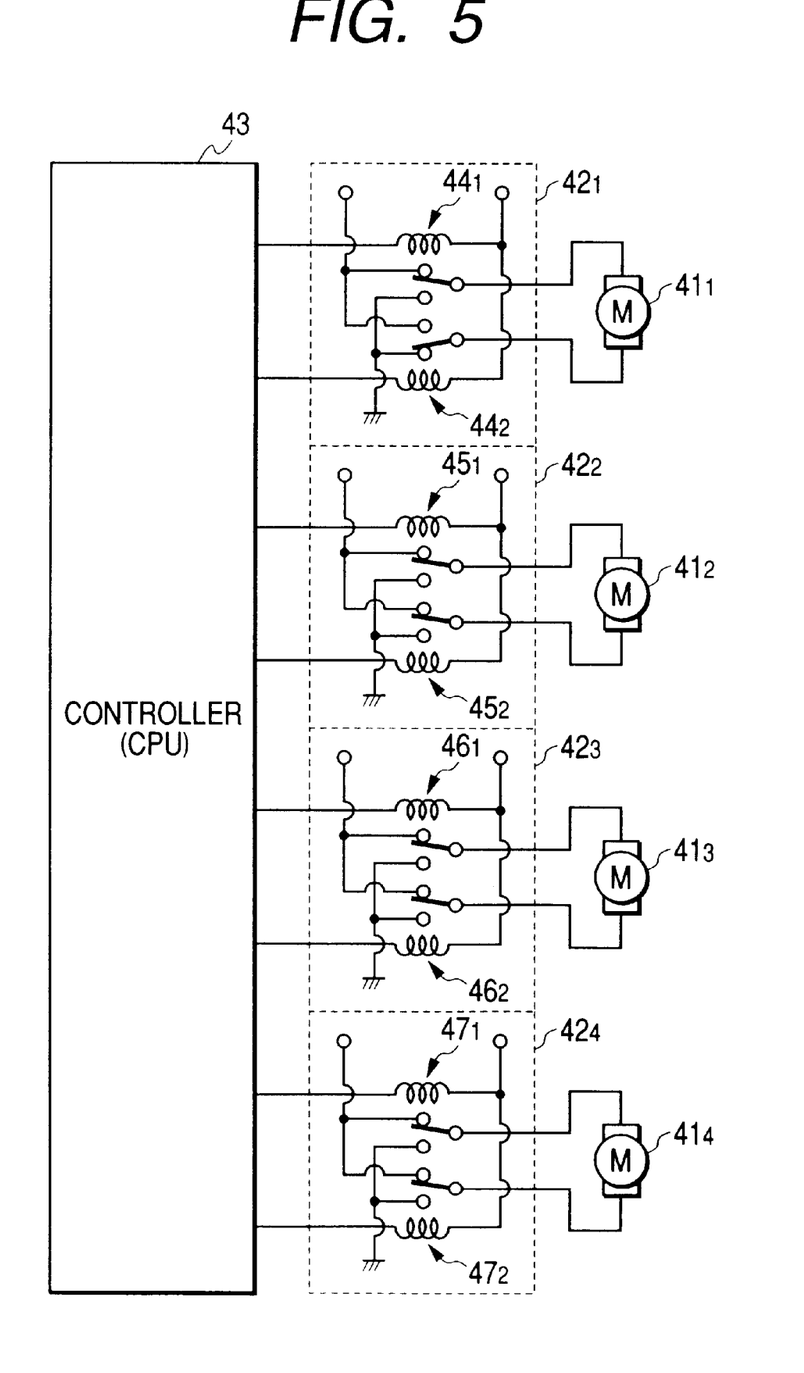
FIG. 5 is a circuit diagram illustrating an example of a structure of the essential portion of the known motor driving apparatus using a motor driving unit including a pair of relays.

Here, FIG. 5 is a circuit diagram illustrating an example of the essential structure of the known motor driving apparatus. This structure utilizes a motor driving unit including a pair of relays.

As illustrated in FIG. 5, the known motor driving apparatus is composed of a first motor $41_1$, a second motor $41_2$, a third motor $41_3$, a fourth motor $41_4$, a first motor driving unit $42_1$, a second motor driving unit $42_2$, a third motor driving unit $42_3$, a fourth motor driving unit $42_4$, and a control unit 43. In this case, the first motor driving unit $42_1$ includes two relays $44_1$, $44_2$, the second motor driving unit $42_2$ includes two relays $45_1$, $45_2$, the third motor driving unit $42_3$ includes two relays $46_1$, $46_2$ and the fourth motor driving unit $42_4$ includes two relays $47_1$, $47_2$.

The first motor driving unit $42_1$ is connected at one end of coils (not designated with the reference numeral) of the relays $44_1$, $44_2$ to a DC power supply and to a control unit 43 at the other end. The movable contacts (not defined with the reference numerals) of the relays $44_1$, $44_2$ are respectively connected to one end and the other end of the first motor $41_1$. One fixed contacts (not defined with the reference numerals) of the relays $44_1$, $44_2$ are connected to the DC power supply, while the other contacts thereof (not defined with the reference numerals) are grounded. The second motor driving unit $42_2$ is connected to the DC power supply at one end of the coils (not defined with the reference numerals) of relays $45_1$, $45_2$ and to the control unit 43 at the other end. The movable contacts (not defined with the reference numerals) of the relays $45_1$, $45_2$ are respectively connected to one end and the other end of the second motor $41_2$ respectively. The one fixed contacts (not defined with the reference numerals) of the relays $45_1$, $45_2$ are connected to the DC power supply, while the other fixed contacts (not defined with the reference numerals) are grounded. The third motor driving unit $42_3$ is connected to the DC power supply at one end of coils (not defined with the reference numerals) of the relays $46_1$, $46_2$, while to the control unit 43 at the other end. The movable contacts (not defined with the reference numerals) of the relays $46_1$, $46_2$ are respectively connected to the one and the other ends of the third motor $41_3$. The one fixed contacts (not defined with the reference numerals) of the relays $46_1$, $46_2$ are connected to the DC power supply, while the other fixed contacts (not defined with the reference numerals) are grounded. The fourth motor driving unit $42_4$ is connected to the DC power supply at one end of the coils (not defined with the reference numerals) of the relays $47_1$, $47_2$, while to the control unit 43 at the other end. The movable contacts (not defined with the reference numerals) of the relays $47_1$, $47_2$ are respectively connected to the one end and the other end of the second motor $41_4$. The one fixed contacts (not defined with the reference numerals) of the relays $47_1$, $47_2$ are connected to the DC power supply, while the other fixed contacts (not defined with the reference numerals) are grounded.

This known motor driving apparatus operates as follows.

First, when the control voltage for the grounded voltage is supplied to the coil of relay $44_1$ of the first motor driving unit $42_1$ from the control unit 43, the coil is energized to switch the movable contact thereof to the condition illustrated in the figure and thereby the power supply voltage is supplied through the contract switched to one end of the first motor $41_1$. Simultaneously, when the control voltage of the power supply voltage is supplied to the coil of relay $44_2$ of the first motor driving unit $42_1$ from the control unit 43, the coil is not energized to keep the movable contact thereof in the condition illustrated in the figure and thereby the ground potential is supplied through the contact held at the other end of the first motor $41_1$. Therefore, a drive current flows to the other end from one end in the first motor $41_1$ and this first motor $41_1$ rotates in one direction. Thereafter, when the polarity of the control voltage supplied to the first motor driving unit $42_1$ from the control unit 43 is inverted, the movable contacts of the relays $44_1$, $44_2$ are set to the inverted condition of the condition illustrated in the figure and the polarity of the voltage supplied to one end and the other end of the first motor $41_1$ is also inverted, a drive current flows to one end from the other end in the first motor $41_1$ and thereby the first motor $41_1$ rotates in the other direction.

Moreover, when the control voltage same as that supplied to the first motor driving unit $42_1$ from the control unit 43 is supplied to the second motor driving unit $42_2$, third motor driving unit $42_3$ and fourth motor driving unit $42_4$ even in the second motor driving unit $42_2$, third motor driving unit $42_3$, fourth motor driving unit $42_4$, the second motor $41_2$, third motor $41_3$ and fourth motor $41_4$ can respectively be rotated as in the case of rotating the first motor $41_1$. When the two motors, for example, the first motor $41_1$ and second motor $41_2$ are rotated simultaneously in the same direction, the movable contacts of the relays $44_1$, $44_2$ of the first motor driving unit $42_1$ and the movable contacts of the corresponding relays $45_1$, $45_2$ of the second motor driving unit $42_2$ are switched in the same manner by supplying the control voltages of the same polarity to the first motor driving unit $42_1$ and second motor driving unit $42_2$ from the control unit 43 and, as a result, the first motor $41_1$ and second motor $41_2$ are rotated simultaneously in the same direction. Moreover, when the other two motors other than the first motor $41_1$ and second motor $41_2$, for example, the third motor $41_3$ and fourth motor $41_4$ are simultaneously rotated in the same direction, the same process as that explained above is executed.

The known motor driving apparatus explained above uses the motor driving units $42_1$ to $42_4$ including two relays of the same number as that of a plurality of motors $41_1$ to $41_4$ in order to respectively drive a plurality of motors $41_1$ to $41_4$. Therefore this apparatus has a merit that the whole motor driving unit can be formed at a low cost in spite of use of a plurality of motor driving units $42_1$ to $42_4$, but, on the other hand, has a disadvantage that since relays require a comparatively large volume, it is difficult to reduce the size of structure of the motor driving apparatus and moreover switching of contacts during operation of relays is rather noisy.

Therefore, it is also considered to use the motor driving units $42_1$ to $42_4$ including a semiconductor switch pair, for example, the field effect transistor pair in place of the motor driving units $42_1$ to $42_4$ including two relays as a plurality of motor driving units $42_1$ to $42_4$. In this case, it is easy to reduce the size of structure of the motor driving apparatus by utilizing the motor driving units $42_1$ to $42_4$ including the semiconductor switch pair, but the field effect transistor pair that may be used for the motor driving units $42_1$ to $42_4$ of a plurality of motors to displace the position of the control object member is more expensive than the relays and thereby the manufacturing cost of the motor driving apparatus inevitably becomes higher depending on the price of the relays.

On the other hand, when the known motor driving apparatus simultaneously drives two motors, for example, the motors $41_1$, $41_2$, if the driving times of the two motors $41_1$, $41_2$ are identical, since the load for displacing two members as the control object that are respectively coupled with the motors $41_1$, $41_2$ does not become identical, the displacement amounts of two members as the control object do not become uniform and therefore it has been impossible to displace the two members as the control object under the condition that these members are balanced.

OBJECT AND SUMMARY OF THE INVENTION

The present invention has been proposed considering the technical background as explained above and the first object of the present invention is to provide a motor driving apparatus using a motor driving unit including small size semiconductor switch pairs in order to attain a totally low price motor driving unit by reducing the total number of motor driving units.

Moreover, the second object of the present invention is to provide a motor driving apparatus that can adjust the driving times of two motors to provide uniform displacement amount of positions of the members controlled with two motors on the occasion of simultaneously driving two motors to displace the positions of the members as the control object.

In view of attaining the first object explained above, the motor driving apparatus of the present invention comprises a first structure, including a plurality of motors for displaying the position of a control object member during rotation, a plurality of motor driving units having one or more semiconductor switch pairs to selectively connect a plurality of the motors to the power supply and a control unit for ON/OFF controlling the semiconductor switch pairs of a plurality of motor driving units, wherein a plurality of the motors form at least a set of motors that is formed with two motors, one end of the motors forming a set is connected to a common motor driving unit having one semiconductor switch pair and the other end thereof is connected respectively to a motor driving unit having two semiconductor switch pairs, and the control unit drives, when the two motors forming a set are driven simultaneously, two motors on the time division basis by ON/OFF controlling the two semiconductor switch pairs to provide inverse output voltage polarities of two semiconductor switch pairs of the motor driving unit connected to the two motors.

According to the first structure explained above, a set of motors is formed with two motors among a plurality of motors and one end of two motors forming a set is connected to the motor driving unit that is common to a plurality of motors having a semiconductor switch pair, while the other end thereof is connected to the same motor driving unit having two semiconductor switch pairs to drive, on the time division basis, two motors via the two semiconductor switch pairs of the same motor driving unit. Therefore, the total number of motor driving units required can be reduced in comparison with the total number of motors used and thereby the total size of the motor driving unit can be reduced to realize a low price motor driving unit.

Moreover, in view of attaining the first and second objects explained above, the motor driving apparatus of the present invention comprises a second structure, including a plurality of motors for displacing the position of the control object member during rotation, a plurality of motor driving units having one or more semiconductor switch pairs to selectively connect a plurality of the motors to the power supply, a control unit for ON/OFF controlling the semiconductor switch pair and a displacement amount detecting unit for detecting the position displacement amount of the control object member, wherein a plurality of said motors form at least a set of motors that is formed of two motors, one end of the motors forming a set is connected to a common motor driving unit including one semiconductor switch pair and the other end thereof is respectively connected to a motor driving unit respectively having two semiconductor switch pairs and the control unit drives, when the two motors forming a set are driven simultaneously, the two motors on the time division basis by ON/OFF controlling the two semiconductor switch pairs to provide inverted output voltage polarities of the two semiconductor switch pairs of the motor driving unit connected to the two motors and also adjusts each drive time of two motors to provide an equal position displacement amount of the control object members with two motors detected by the displacement mount detecting unit in regard to the drive time of two motors.

According to the second structure explained above, the function that is same as that attained with the first structure can be attained and since each drive time of these two motors forming a set is adjusted to make equal the position displacement amount of the control object member with two motors forming a set, the position displacement amount of the control object member with two motors driven simultaneously is always kept equal and thereby unbalance condition when the position of the control object member is displaced can be eliminated.

The semiconductor switch pair in the first and second structures is suitably a field effect transistor pair connected in series across the power supply.

With the structure explained above, the semiconductor switch pair can be formed with a small-size integrated circuit that easily enables mounting of the motor driving unit.

DETAILED DESCRIPTION OF THE PREFERRED EMBODIMENTS

The preferred embodiments of the present invention will be explained with reference to the accompanying drawings.

Figure 1:
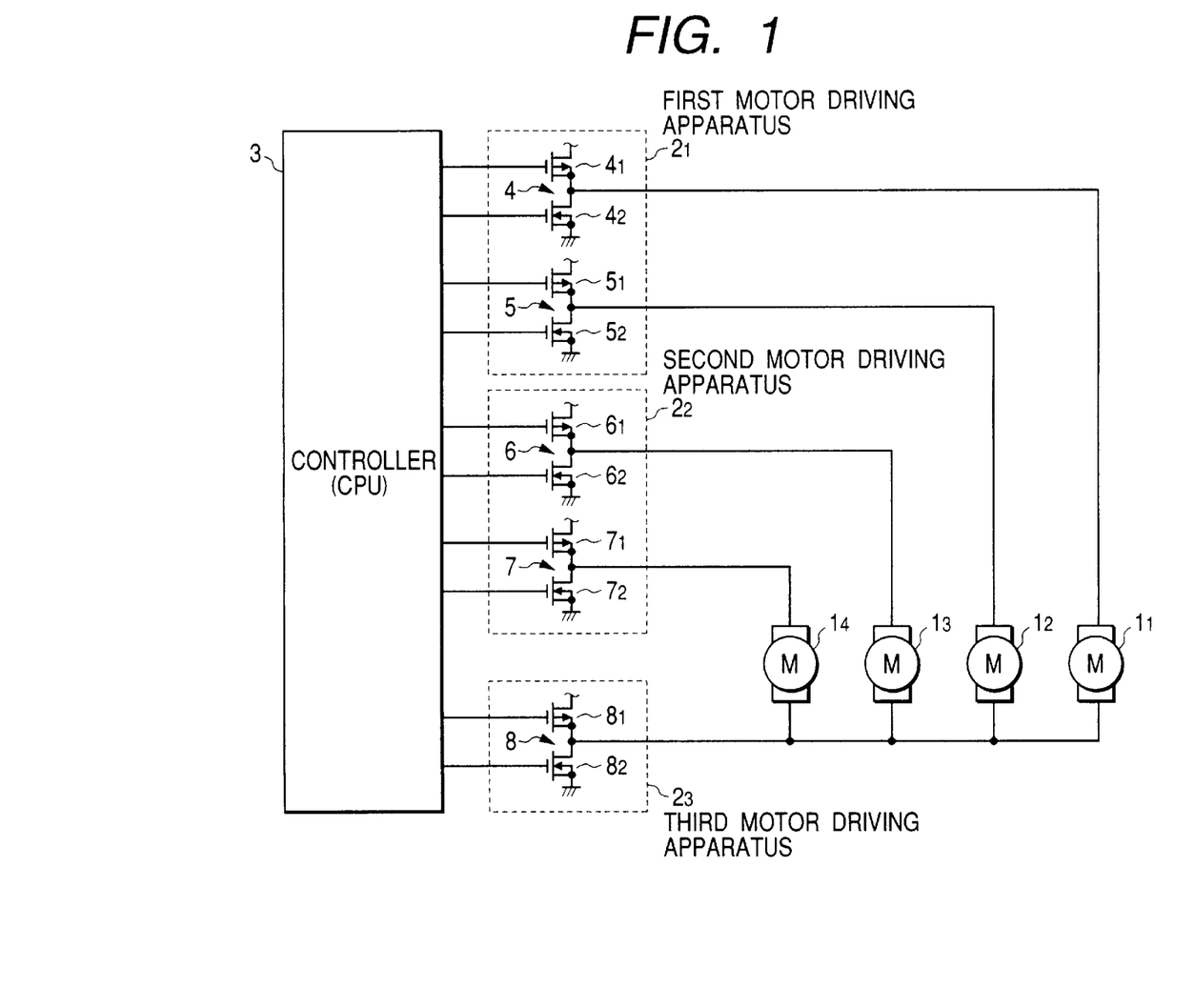
FIG. 1 is a circuit diagram illustrating a structure of the essential portion as the first embodiment of the motor driving unit of the present invention.

FIG. 1 is a circuit diagram illustrating a structure of the essential portion as the first embodiment of the motor driving apparatus of the present invention.

As illustrated in FIG. 1, the motor driving apparatus of the first embodiment is composed of a first motor $1_1$, a second motor $1_2$, a third motor $1_3$, a fourth motor $1_4$, a first motor driving unit $2_1$, a second motor driving unit $2_2$, a third motor driving unit $2_3$ and a control unit (CPU) 3. In this case, the first motor driving unit $2_1$ comprises a first field effect transistor (hereinafter, referred to as FET) switch pair (semiconductor switch pair) 4 and a second FET switch pair (semiconductor switch pair) 5, while the second motor driving unit $2_2$ comprises a first FET switch pair (semiconductor switch pair) 6 and a second FET switch pair (semiconductor switch pair) 7 and the third motor driving unit $2_3$ comprises one FET switch pair (semiconductor switch pair) 8. Moreover, in the first motor driving unit $2_1$, the first FET switch pair 4 is composed of two FET switches $4_1$, $4_2$ connected in series between the power supply terminal and the ground, while the second FET switch pair 5 is composed of two FET switches $5_1$, $5_2$ connected in series between the power supply terminal and the ground. In the second motor driving unit $2_2$, the first FET switch pair 6 is composed of two FETs $6_1$, $6_2$ connected in series between the power supply terminal and the ground and the second FET switch pair 7 is composed of two FETs $7_1$, $7_2$ connected in series between the power supply terminal and the ground. In the third motor driving unit $2_3$, the FET switch pair 8 is composed of two FETs $8_1$, $8_2$ connected in series between the power supply terminal and the ground.

In the first motor driving unit $2_1$, the first FET switch pair 4 is connected to the control unit 3 at each gate of $FET4_1$ and $FET4_2$ and also connected to one end of the first motor $1_1$ at the connecting point of $FET4_1$ and $FET4_2$. The second FET switch pair 5 is connected to the control unit 3 at each gate of $FET5_1$ and $FET5_2$ and is also connected to one end of the second motor $1_2$ at the connecting point of $FET5_1$ and $FET5_2$. Moreover, in the second motor driving unit $2_2$, the first FET switch pair 6 is connected to the control unit 3 at each gate of $FET6_1$ and $FET6_2$ and is also connected to one end of the third motor $1_3$ at the connecting point of $FET6_1$ and $FET6_2$. The second FET switch pair 7 is connected to the control unit 3 at each gate of $FET7_1$ and $FET7_2$ and is also connected to one end of the fourth motor $1_4$ at the connecting point of $FET7_1$ and $FET7_2$. Moreover, in the third motor driving unit $2_3$, the FET switch pair 8 is connected to the control unit 3 at each gate of $FET8_1$ and $FET8_2$ and is also connected in common to the other end of the first to fourth motors $1_1$ to $1_4$ at the connecting point of $FET8_1$ and $FET8_2$.

In this case, the first motor $1_1$ and second motor $1_2$ among the first motor $1_1$, second motor $1_2$, third motor $1_3$ and fourth motor $1_4$ form the same set, while the third motor $1_3$ and fourth motor $1_4$ form the same set.

Figure 2A:
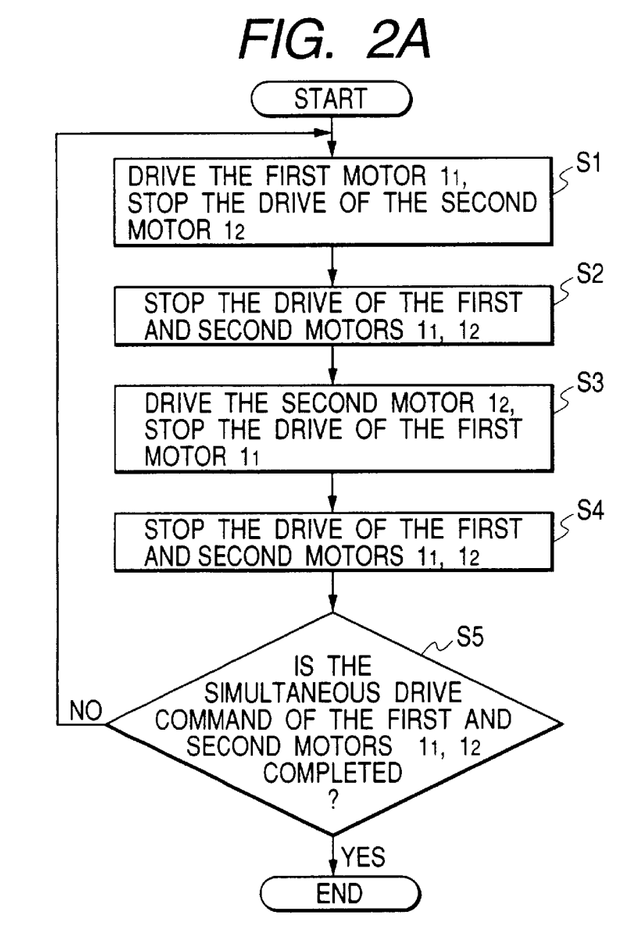
FIGS. 2(a) and 2(b) are a flowchart of the operation process when two motors forming a set are driven simultaneously in the motor driving apparatus as the first embodiment and an explanatory diagram of an example of the flowing condition of the drive current of two motors forming a set.
Figure 2B:
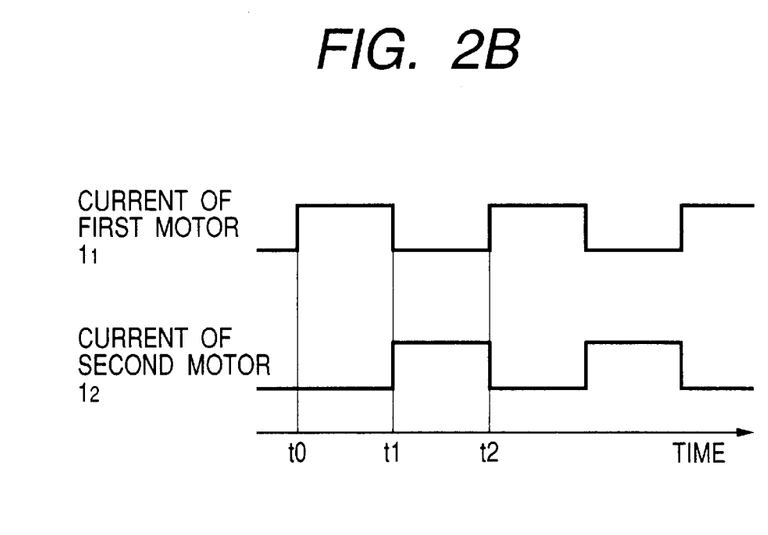

Next, FIG. 2(a) is a flowchart illustrating the operation process when two motors of the same set, for example, the first motor $1_1$ and second motor $1_2$ are driven simultaneously in the motor driving apparatus of the first embodiment, while FIG. 2(b) is an explanatory diagram of an example of the drive current waveforms of two motors of the same set.

Operations of the motor driving apparatus of the first embodiment will be explained with reference to the flowchart of FIG. 2(a) and an explanatory diagram of FIG. 2(b).

First, in the step S1, the control unit 3 supplies the ground potential to the gates of FETs $4_1$, $4_2$ of the FET switch pair 4 of the first motor driving unit $2_1$ as the control voltages, supplies the power supply voltage to the gate of FETs $5_1$, $5_2$ of the FET switch pair 5 and supplies the power supply voltage to the gates of FETs $8_1$, $8_2$ of the FET switch pair 8 of the third motor driving unit $2_3$. With supply of these control voltages, $FET4_1$, $5_2$, $8_2$ turn ON, while FETs $4_2$, $5_1$, $8_1$ turn OFF. In this case, the first motor $1_1$ rotates in one direction to displace the position of the control object member coupled with the first motor $1_1$ because the power supply voltage is supplied to one end thereof via $FET4_1$ and the ground potential to the other end via $FET8_2$ and thereby a drive current flows as indicated with the time t0 to t1 of the upper current waveform of FIG. 2(b). Moreover, in the second motor $1_2$, the ground potential is supplied to one end via $FET5_2$, while the ground potential to the other end via $FET8_2$ and therefore a drive current does not flow as indicated with the time t0 to t1 of the lower current waveform of FIG. 2(b).

Next, in the step S2, after elapse of a constant period from start of the step S1, the control unit 3 switches the supply of the power supply voltage to the gates of FETs $4_1$, $4_2$ of the FET switch pair 4 as the control voltages and also supplies the power supply voltage as the other control voltage. With supply of these control voltages, $FET4_2$ turns ON together with FETs $5_2$, $8_2$, $FET4_1$ turns OFF together with FETs $5_1$ and $8_1$. In this case, the ground potential is supplied to one end and the other end of the first motor $1_1$ and the ground potential is also supplied to one end and the other end of the second motor $1_2$, thereby the drive current does not flow into the first motor $1_1$ and the second motor $1_2$ and enters the drive waiting condition.

Next, in the step S3, after elapse of an extremely short period from start of the step S2, the control unit 3 supplies, respectively as the control voltages, the power supply voltage equal to that explained above to the gates of FETs $4_1$, $4_2$ of the FET switch pair 4, switches the supply of the ground potential for the gates of FETs $5_1$, $5_2$ of the FET switch pair 5 and also supplies the same power supply voltage as that explained above to the gates of FETs $8_1$, $8_2$ of the FET switch pair 8. With supply of these control voltages, FETs $4_2$, $5_1$, $8_2$ turn ON, while FETs $4_1$, $5_2$, $8_1$ turn OFF. In this case, since the ground potential is supplied to the one end of first motor $1_1$ via $FET4_2$ and the ground potential is also supplied to the other end via $FET8_2$, a drive current does not flow as illustrated in the time t1 to t2 of the upper current waveform of FIG. 2(b). Moreover, since the power supply voltage is supplied to one end of the second motor $1_2$ via $FET5_1$ and the ground potential is supplied to the other end via $FET8_2$, a drive current flows as illustrated in the time t1 to t2 of the lower current waveform of FIG. 2(b). Therefore, the second motor $1_2$ rotates in one direction to displace the position of the control object member coupled with the second motor $1_2$.

In the subsequent step S4, after elapse of a constant period from start of the step S3, the control unit 3 supplies, respectively as the control voltages, the power supply voltage through the switching to the gates of FETs $5_1$, $5_2$ of the FET switch pair 5 and also supplies the power supply voltage equal to that explained above as the other control voltage. With supply of these control voltages, $FET5_2$ turns ON together with FETs $4_2$, $8_2$ and $FET5_1$ is switched to turn OFF together with FETs $4_1$, $8_1$. In this case, the ground potential is supplied to one end and the other end of the first motor $1_1$, the ground potential is also supplied to one end and the other end of the second motor $1_2$ but a drive current does not flow into the first motor $1_1$ and second motor $1_2$ and enter the drive waiting condition.

Thereafter, in the step S5, after elapse of an extremely short period of time from start of the step S4, the control unit 3 determines whether or not the simultaneous drive command is issued to the first motor $1_1$ and second motor $1_2$. When it is determined (Y) that the simultaneous drive command to the first motor $1_1$ and second motor $1_2$ is issued, a series of this flowchart is completed and on the other hand, when it is determined (N) that the simultaneous drive command is not yet issued, the process returns to the first step S1 and the operations after the step S1 are repeated.

As explained above, according to the flowchart of FIG. 2(a), the first motor $1_1$ and second motor $1_2$ can be driven simultaneously on the time division basis and thereby the control object member coupled with the first motor $1_1$ and the control object member coupled with the second motor $1_2$ can virtually be displaced in their positions simultaneously.

The flowchart explained above regards to an example where the first motor $1_1$ and second motor $1_2$ of the same set are driven simultaneously on the time division basis, but the third motor $1_3$ and fourth motor $1_4$ of the same set can also be driven simultaneously on the time division basis by supplying from the control unit 3 the control voltage of the same polarity as that explained above to the FET switch pair 6 and FET switch pair 7 of the second motor driving unit $2_2$ as explained above in place of the first motor driving unit $2_1$.

Figure 3:
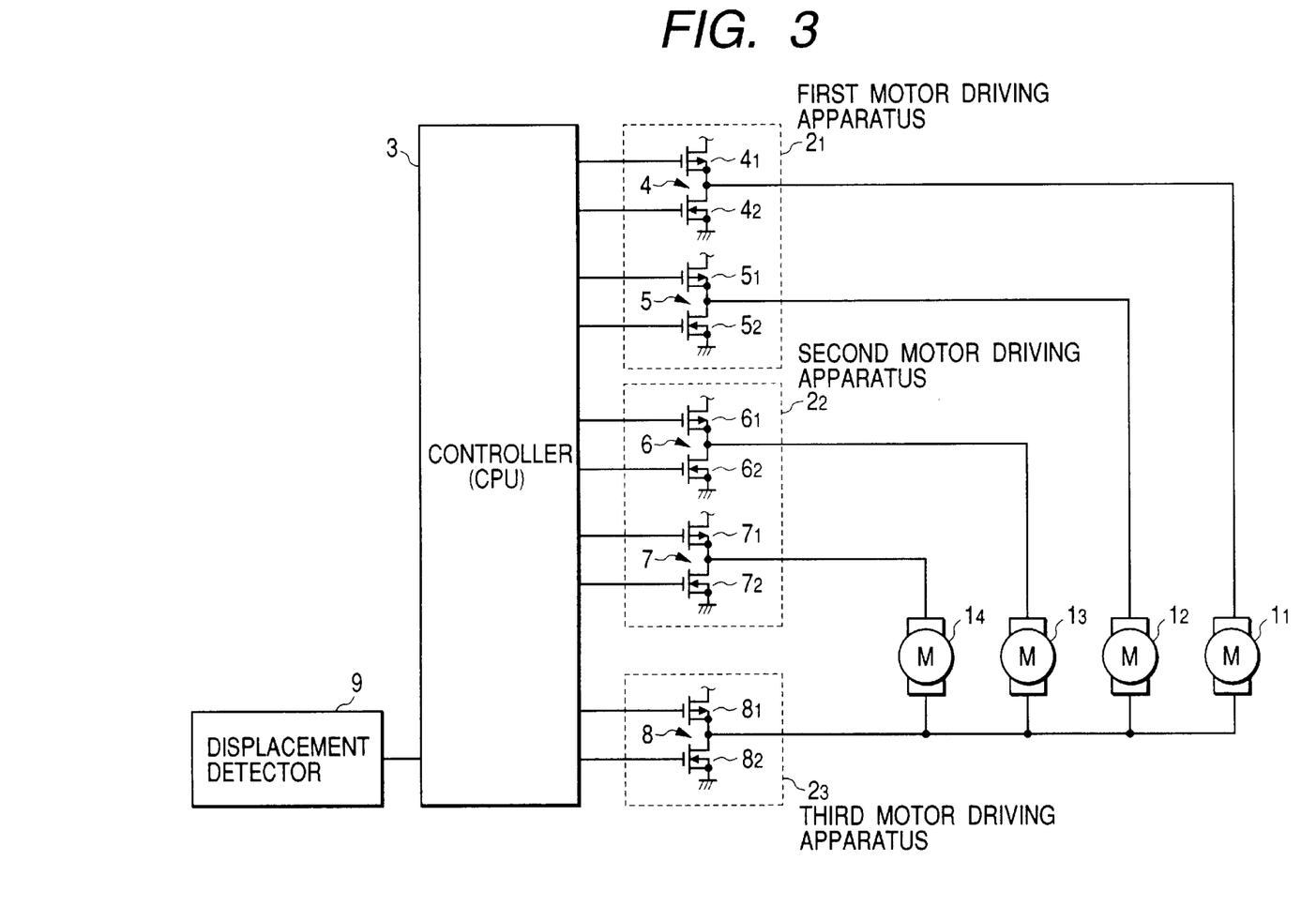
FIG. 3 is a circuit diagram illustrating a structure of the essential portion of the second embodiment of the motor driving apparatus of the present invention.

Next, FIG. 3 is a circuit diagram illustrating a structure of the essential portion of the second embodiment of the motor driving apparatus of the present invention. In this example, the position displacement amount of the control object member with the first motor $1_1$ is set equal to that of the control object member with the second motor $1_2$.

As illustrated in FIG. 3, is also provided with a displacement amount detecting unit 9 to respectively detect the position displacement amount of each control object member that is displaced with the first to fourth motors $1_1$ to $1_4$, in addition to the structure of the motor driving apparatus of the first embodiment and this displacement amount detecting unit 9 is connected to the control unit 1. Here, in FIG. 3, the structural elements like those illustrated in FIG. 1 are designated with the same reference numerals.

Figure 4:
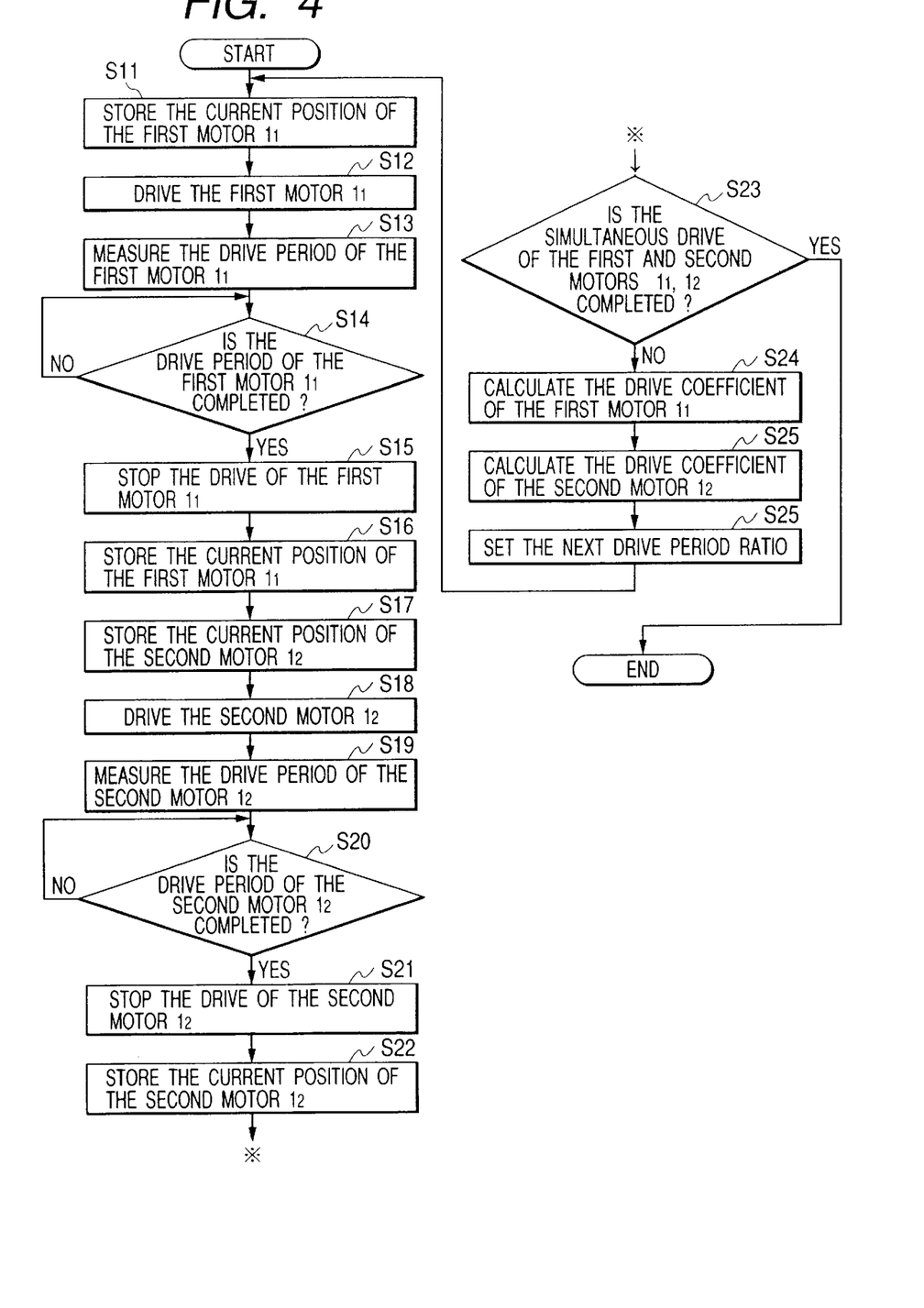
FIG. 4 is a flowchart of the operation process when two motors forming a set are driven simultaneously in the motor driving apparatus of the second embodiment.

Moreover, FIG. 4 is a flowchart illustrating the operation process when the motors of the same set, for example, the first motor $1_1$ and second motor $1_2$ are driven simultaneously in the motor driving apparatus of the second embodiment.

Operations of the motor driving apparatus of the second embodiment will be explained with reference to the flow chart of FIG. 3.

First, in the step S11, the control unit 3 detects the current position of the first motor $1_1$ through the displacement amount detecting unit 9 and stores the detection result (drive start position) $P_{11}$ in the internal memory.

Next, in the step S12, the control unit 3 drives the first motor $1_1$ to rotate under the same supply condition as that to the first motor driving unit $2_1$ and third motor driving unit $2_3$ in the step S1 of FIG. 2 on the occasion of supplying the control voltage to the first motor driving unit $2_1$ and third motor control unit $2_3$ in order to set the second motor $1_2$ to the rotation stop condition.

In this case, in the step S13, the control unit 3 measures the period in which the first motor $1_1$ is driven to rotate.

Next, in the step S14, the control unit 3 determines whether or not the rotation drive time of the first motor $1_1$ has reached the preset time. When it is determined (Y) that the rotation drive time has reached the preset time, the process goes to the next step S15. On the other hand, when it is determined (N) that the rotation drive time does not yet reach the preset time, the operations of the step S14 are repeated.

Subsequently, in the step S15, the control unit 3 stops the rotation drive of the first motor $1_1$ and also sets the second motor $1_2$ to the rotation drive condition explained above by setting the supply condition that is same as that of the control voltage to the first motor driving unit $2_1$ and the third motor driving unit $2_3$ in the step S2 of FIG. 2, on the occasion of supplying the control voltage to the first motor driving unit $2_1$ and third motor driving unit $2_3$. In this case, in the step S16, the control unit 3 detects the current position of the first motor $1_1$ through the displacement amount detecting unit 9 and stores the detection result (drive end position) $P_{12}$ in the internal memory.

In the subsequent step S17, the control unit 3 detects the current position of the second motor $1_2$ via the displacement amount detecting unit 9 and then stores the detection result (drive start position) $P_{21}$ in the internal memory.

Next, in the step S18, the control unit 3 drives the second motor $1_2$ to rotate to stop the rotation of the first motor $1_1$ under the same condition as that for supplying the control voltage to the first motor driving unit $2_1$ and the third motor driving unit $2_3$ in the step S3 of FIG. 2 on the occasion of supplying the control voltage to the first motor driving unit $2_1$ and third motor driving unit $2_3$.

In this case, in the step S19, the control unit 3 measures the period to drive the second motor $1_2$ to rotate.

Next, in the step S20, the control unit 3 determines whether the rotation drive time of the second motor $1_2$ has reached the preset time or not. When it is determined (Y) that the rotation drive time has reached the preset time, the operation goes to the next step S21 and when it is determined (N) that the rotation drive time does not yet reach the preset time, operations of this step S20 is repeated.

Here, as the preset times (rotation drive time) $T_1$ of the first motor $1_1$ in the preceding step S14 and the present time (rotation drive time) $T_2$ of the second motor $1_2$ in the step S20, the preset times $T_1$, $T_2$ that are set in the preceding simultaneous drive are used, but since there is no preset time that is set in the preceding simultaneous drive when the first motor $1_1$ and the second motor $1_2$ are driven simultaneously, both preset times $T_1$, $T_2$ are set to the equal value. Subsequently, in the step S21, the control unit 3 stops the rotation drive of the second motor $1_2$ to also stop the rotation drive of the first motor $1_1$ by setting, at the time of supplying the control voltage to the first motor driving unit $2_1$ and the third motor driving unit $2_3$, the supply condition that is same as that of the control voltage to the first motor driving unit $2_1$ and the third motor driving unit $2_3$ in the step S4 of FIG. 2. In this case, in the step S22, the control unit 3 detects the current position of the second motor $1_2$ through the displacement amount detecting unit 9 and stores the detection result (drive end position) $P_{22}$ in the internal memory. In the subsequent step S23, the control unit 3 determines whether or not the simultaneous drive command to the first motor $1_1$ and second motor $1_2$ is completed as in the case of the determination in the step S5 of FIG. 2. When it is determined (Y) that the simultaneous drive command to the first motor $1_1$ and second motor 12 is completed, the processes in the flowchart come to the end, and on the other hand, when it is determined (N) that the simultaneous drive command is not yet completed, the process goes to the next step S24.

Next, in the step S24, the control unit 3 calculates the coefficient $K_1$ for setting the time duty to apply a drive current to the first motor $_1$. This coefficient $K1_1$ is calculated based on the following formula (1) using the drive start position $P_{11}$ and drive end position $P_{12}$ of the first motor $1_1$ and the drive start position $P_{21}$ and drive end position $P_{22}$ of the second motor $1_2$ stored in the internal memory.

$$K_1=|P_{21}-P_{22}|/(|P_{11}-P_{12}|+|P_{21}-P_{22}|) \quad (1)$$

Thereafter, in the step S25, the control unit 3 obtains the coefficient $K_2$ for setting the time duty to apply a drive current to the second motor $1_2$. This coefficient $K_2$ can be calculated based on the following formula (2) using the drive start position $P_{11}$ and drive end position $P_{12}$ of the first motor $1_1$ and the drive start position $P_{21}$ and drive end position $P_{22}$ of the second motor $1_2$ stored in the internal memory.

$$K_2=|P_{11}-P_{12}|/(|P_{11}-P_{12}|+|P_{21}-P_{22}|) \quad (2)$$

Next, in the step S26, the control unit 3 calculates the next setting times (drive time ratios) $T_1$, $T_2$ using the drive basic time $T_B$ for driving simultaneously the first motor $1_1$ and second motor $1_2$ and the calculated coefficients $K_1$, $K_2$. As the calculation formula, $T_1=T_B \times K_1$ is used for the setting time $T_1$ and $T_2=T_B \times K_2$ is used for the setting time $T_2$. When these setting times $T_1$, $T_2$ are calculated, the process returns to the first step S11 and the operations of the step S11 and subsequent steps are repeated.

Here, an example of the setting times $T_1$, $T_2$ in the second embodiment will be explained. When it is assumed that the basic time $T_B$ is 100 msec, the drive start position $P_{11}$ of the first motor $1_1$ is 50 and the drive start position $P_{21}$ of the second motor $1_2$ is also 50, if the drive end position $P_{12}$ of the first motor $1_1$ after elapse of the unit time becomes 100 and the drive end position $P_{22}$ of the second motor $1_2$ becomes 75, the drive displacement position $|P_{11}-P_{12}|$ of the first motor $1_1$ becomes $|100-50|=50$ and the drive displacement position $|P_{21}-P_{22}|$ of the second motor $1_2$ becomes $|100-75|=25$. When $K_1$, $K_2$ are obtained using the formulae (1), (2), $K_1$ becomes $25/(50+25)=\frac{1}{3}$ and $K_2$ becomes $50/(50+25)=\frac{2}{3}$. As a result, the setting time $T_1$ becomes 100 msec$\times\frac{1}{3}$=33.3 msec, while the setting time $T_2$ becomes 100 msec$\times\frac{2}{3}$=66.7 msec.

Namely, in this example, when the time duty to drive the first motor $1_1$ is set to 33.3 msec and the duty time to drive the second motor $1_2$ is set to 66.7 msec for the total drive time of 100 msec, the drive displacement position $|P_{11}-P_{12}|$ of the first motor $1_1$ becomes equal to the drive displacement position $|P_{21}-P_{22}|$ of the second motor $1_2$.

As explained above, according to an invention of the present invention, since two motors among a plurality of motors are formed as a set, one end of the two motors forming a set is connected to the motor driving unit common to a plurality of motors having one semiconductor switch pair and the other end is connected to the same motor driving unit having two semiconductor switch pairs and thereby two motors are driven on the time division basis via the two semiconductor switch pairs of the same motor driving unit, there is provided the effect that the total number of necessary motor driving units can be reduced in comparison with the total number of motors used, the total size of the motor driving unit can also be reduced and thereby low-cost motor driving unit can be attained.

Moreover, according to the other invention of the present invention, since each drive time of two motors is adjusted to provide equal position displacement amount of the control object member with two motors forming a set, in addition to the effect attained by one invention of the present invention, there is provided the effect that position displacement amount of the control object member with two motors driven simultaneously always becomes equal and thereby unbalance condition when the control object member position is displaced can be eliminated.

What is claimed is:

1. A motor driving apparatus comprising a plurality of motors for displacing a position of a control object member during rotation, a plurality of motor driving units having at least one semiconductor switch pair to selectively connect the motors to a power supply and a control unit for ON/OFF controlling the semiconductor switch pair of the motor driving units, wherein a set of motors is formed of two motors, one end of the two motors forming the set is connected to a common motor driving unit having one semiconductor switch pair and another end thereof is connected respectively to a motor driving unit having two semiconductor switch pairs and the control unit drives, when the two motors forming the set are driven simultaneously, the two motors on a time division basis by ON/OFF controlling the two semiconductor switch pairs to provide inverse output voltage polarities of the two semiconductor switch pairs of the motor driving unit connected to the two motors.

2. A motor driving apparatus comprising a plurality of motors for displacing a position of a control object member during rotation, a plurality of motor driving units having at least one semiconductor switch pair to selectively connect the motors to a power supply, a control unit for ON/OFF controlling the semiconductor switch pair and a displacement amount detecting unit for detecting a position displacement amount of the control object member, wherein a set of motors is formed of two motors, one end of the two motors forming the set is connected to a common motor driving unit having one semiconductor switch pair and another end thereof is respectively connected to a motor driving unit having two semiconductor switch pairs and the control unit drives, when the two motors forming the set are driven simultaneously, the two motors on a time division basis by ON/OFF controlling the two semiconductor switch pairs to provide inverse output voltage polarities of the two semiconductor switch pairs of the motor driving unit connected to the two motors and also adjusts each drive time of the two motors to provide an equal position displacement amount of the control object member with the two motors detected by the displacement amount detecting unit.

3. A motor driving apparatus according to claim 1, wherein the semiconductor switch pair is formed of a field effect transistor pair connected in series across the power supply.

4. A motor driving apparatus according to claim 2, wherein the semiconductor switch pair is formed of a field effect transistor pair connected in series across the power supply.

* * * * *